United States Patent
McClure

(10) Patent No.: US 10,802,983 B2
(45) Date of Patent: Oct. 13, 2020

(54) PROGRAMMABLE BLOCK STORAGE ADDRESSING USING EMBEDDED VIRTUAL MACHINES

(71) Applicant: VMware, Inc., Palo Alto, CA (US)

(72) Inventor: Matthew D. McClure, Alameda, CA (US)

(73) Assignee: VMware, Inc., Palo Alto ( * ) Notice: Subject to any disclaimer, the term of this patent is extended or adjusted under 35 U.S.C. 154(b) by 134 days.

(21) Appl. No.: 15/994,933

(22) Filed: May 31, 2018

(65) Prior Publication Data

US 2019/0370182 A1    Dec. 5, 2019

(51) Int. Cl.
*G06F 12/00* (2006.01)
*G06F 12/10* (2016.01)
*H04L 29/08* (2006.01)

(52) U.S. Cl.
CPC ........ *G06F 12/10* (2013.01); *G06F 2212/657* (2013.01); *H04L 67/1097* (2013.01)

(58) Field of Classification Search
CPC . G06F 12/10; G06F 2212/657; H04L 67/1097
See application file for complete search history.

(56) References Cited

U.S. PATENT DOCUMENTS

| | | | | |
|---|---|---|---|---|
| 5,621,912 A * | 4/1997 | Borruso | ............... | G06F 9/468 714/E11.145 |
| 6,643,744 B1 * | 11/2003 | Cheng | ............... | A63F 13/10 711/137 |
| 7,418,584 B1 * | 8/2008 | Klaiber | ............... | G06F 9/45533 712/229 |
| 8,826,013 B1 * | 9/2014 | Kodukula | ............... | G06F 21/53 380/279 |
| 10,671,737 B2 * | 6/2020 | Durham | ............... | G06F 21/57 |
| 2010/0293349 A1 * | 11/2010 | Lionetti | ............... | G06F 9/45558 711/162 |
| 2011/0154318 A1 * | 6/2011 | Oshins | ............... | G06F 9/45537 718/1 |
| 2013/0227550 A1 * | 8/2013 | Weinstein | ............... | G06F 9/45558 718/1 |
| 2014/0089616 A1 * | 3/2014 | Shanbhogue | ............... | G06F 12/145 711/163 |

(Continued)

OTHER PUBLICATIONS

Ken Beer, Ryan Holland, "Encyrpting Data at Rest" https://d0.awsstatic.com/whitepapers/AWS_Securing_Data_at_Rest_with_Encryption.pdf.

(Continued)

*Primary Examiner* — Prasith Thammavong
(74) *Attorney, Agent, or Firm* — Patterson + Sheridan, LLP

(57) ABSTRACT

The disclosure provides an approach for obscuring the organization of data within a storage system by embedding virtual machines within blocks of the storage system. A storage system may receive a command comprising an address. The address may correspond to a location of an embedded virtual machine within the storage system. The virtual machine instantiates and executes an opaque algorithm, the algorithm returning a new address. The new address corresponds to the real location of data on with the command is executed. The logic of the algorithm is obscured within the virtual machine, making the algorithm less predictable and thus, more secure.

20 Claims, 4 Drawing Sheets

(56) References Cited

U.S. PATENT DOCUMENTS

| | | | |
|---|---|---|---|
| 2014/0297981 A1* | 10/2014 | Kameyama | G06F 3/065 |
| | | | 711/162 |
| 2015/0039838 A1* | 2/2015 | Tarasuk-Levin | G06F 12/0862 |
| | | | 711/137 |
| 2015/0106802 A1* | 4/2015 | Ivanov | G06F 9/45558 |
| | | | 718/1 |
| 2016/0196415 A1* | 7/2016 | Liu | G06F 21/57 |
| | | | 726/18 |
| 2017/0054720 A1* | 2/2017 | Geng | H04L 67/1097 |
| 2017/0308473 A1* | 10/2017 | Bassi | G06F 3/0665 |
| 2018/0077242 A1* | 3/2018 | Carl | H04L 67/12 |

OTHER PUBLICATIONS

Moritz Lipp, et al., "Meltdown" https://meltdownattack.com/meltdown.pdf.
Paul Kocher, et al., "Spectre Attacks: Exploiting Speculative Execution" https://spectreattack.com/spectre.pdf.
Kartik Kulkarni, et al., "GPU Filesystem Encryption" https://www.cs.cmu.edu/afs/cs/academic/class/15418-s12/www/competition/www.contrib.andrew.cmu.edu/~elinkov/Finalreport.pdf.
Michael A. Sevilla, et al., "Malacology: A Programmable Storage System" https://www.soe.ucsc.edu/sites/default/files/technical-reports/UCSCSOE-17-04.pdf.

* cited by examiner

PROGRAMMABLE BLOCK STORAGE ADDRESSING USING EMBEDDED VIRTUAL MACHINES

BACKGROUND

Data centers often include storage systems. The stored data in such storage systems might be sensitive, proprietary, or confidential. Data security is thus of high importance in a data center. In addition to encrypting data, data centers use algorithms to scatter data throughout the storage system so that the data is not easily reconstructable by a malicious entity that might be able to decrypt the data. In particular, a malicious entity would first need to order the data correctly if the data is scattered in different locations on the storage system, and only then could they organize the data into a useable order.

Data centers typically use a single, static algorithm to scatter data within the storage system. If the algorithm used for scattering data is discovered by a malicious entity, such as by observing placement of data within the storage system, then the entity may be able to reconstruct the scattered data using the algorithm. This compromises security of the storage system.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

The disclosure provides techniques for obscuring organization of data within a storage system. Embodiments of the techniques include embedding virtual machines within blocks of the storage system. For example, the storage system may receive a command (e.g., write, read, etc.) comprising an address indicative of a location on the storage system (e.g., of one or more blocks). The location may contain code for a virtual machine. The storage system may instantiate the virtual machine, which executes an algorithm, which may be opaque and dynamic. The algorithm is opaque in that the logic of the algorithm is masked within the execution of a virtual machine. The algorithm is dynamic in that it is upgradeable, as discussed with reference to FIG. 3 below. The executed algorithm then returns another address that may correspond to location in the storage system on which the command is to actually be performed. Logic of the algorithm is obscured within the operation of the virtual machine, making the algorithm more secure. In certain embodiments, different blocks of the storage system may include virtual machines that use different algorithms, providing further security and diversity.

Figure 1A:
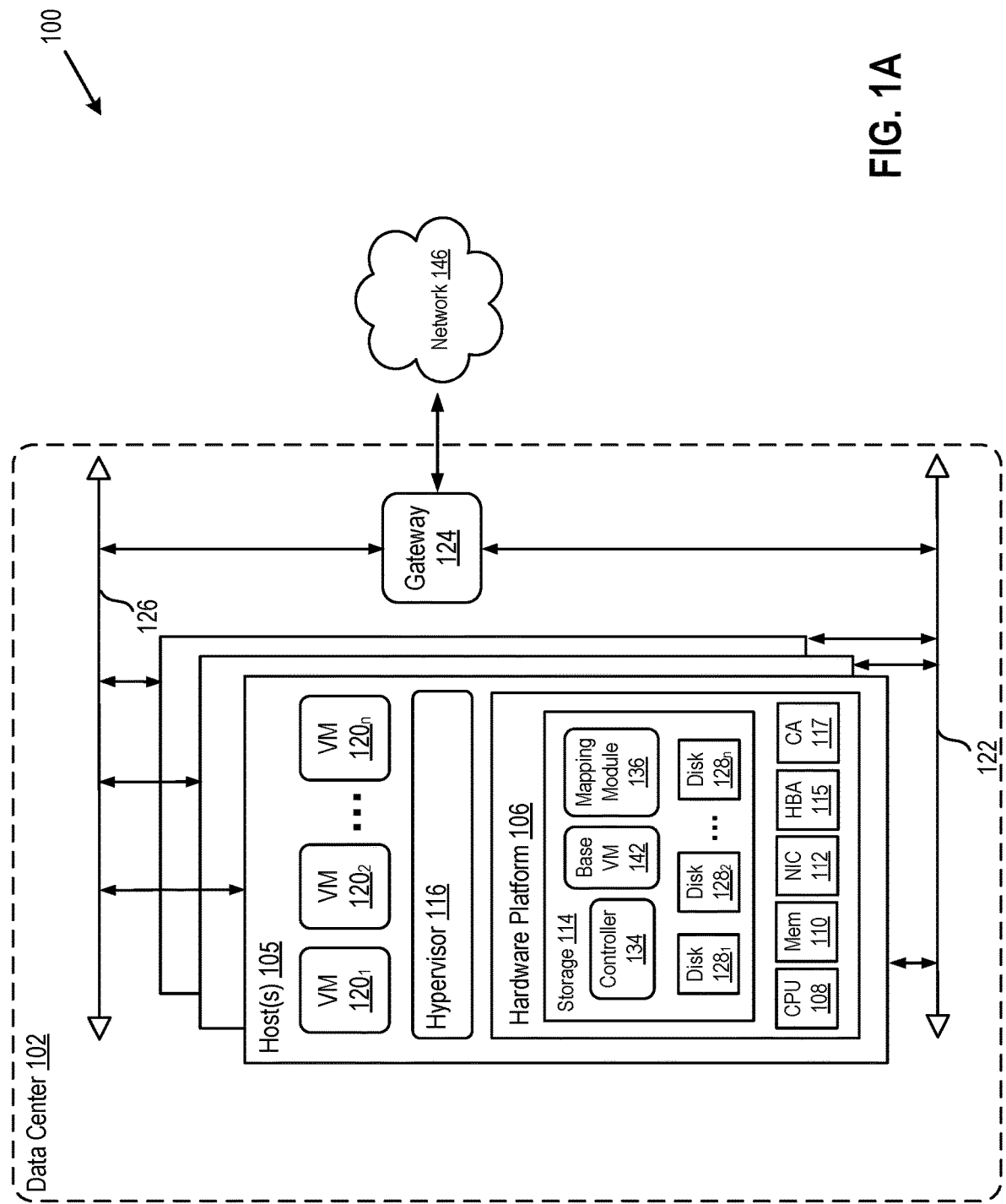
FIG. 1A depicts a block diagram of a computer system in which one or more embodiments of the present disclosure may be utilized.

FIG. 1A depicts a block diagram of a computer system 100 in which one or more embodiments of the present disclosure may be utilized. Data center 102 may be an on-premise data center or a cloud data center. Data center 102 includes host(s) 105, a gateway 124, a management network 126, and a data network 122. Although the management and data network are shown as separate physical networks, it is also possible in some implementations to logically isolate the management network from the data network using different virtual local area network (VLAN) identifiers. Each of hosts 105 may be constructed on a server grade hardware platform 106, such as an x86 architecture platform. For example, hosts 105 may be geographically co-located servers on the same rack or on different racks in any arbitrary location in datacenter 102.

Host 105 is configured to provide a virtualization layer, also referred to as a hypervisor 116, that abstracts processor, memory, storage, and networking resources of hardware platform 106 into multiple virtual machines $120_1$ to $120_n$ (collectively referred to as VMs 120 and individually referred to as VM 120). VMs on the same host 105 may run concurrently. Although the disclosure teaches techniques with reference to VMs, the techniques may also be performed by using other virtual computing instances (VCIs), such as containers, Docker containers (see, e.g., www.docker.com), data compute nodes, isolated user space instances, namespace containers, and the like.

Hypervisor 116 architecture may vary. In some embodiments, a virtualization software can be installed as system level software directly on the server hardware (often referred to as "bare metal" installation) and be conceptually interposed between the physical hardware and the guest operating systems executing in the virtual machines. Alternatively, the virtualization software may conceptually run "on top of" a conventional host operating system in the server. In some implementations, hypervisor 116 may comprise system level software as well as a "Domain 0" or "Root Partition" virtual machine, which is a privileged machine that has access to the physical hardware resources of the host. In this implementation, a virtual switch, virtual tunnel endpoint (VTEP), etc., along with hardware drivers, may reside in the privileged virtual machine. One example of hypervisor 116 that may be used is a VMware ESXi™ hypervisor provided as part of the VMware vSphere® solution made commercially available from VMware, Inc. of Palo Alto, Calif.

Hardware platform 106 of each host 105 may include components of a computing device such as one or more processors (CPUs) 108, system memory 110, a network interface 112, storage system 114, a local host bus adapter (HBA) 115, a compute accelerator (CA) 117, and other I/O devices such as, for example, a mouse and keyboard (not shown). CPU 108 is configured to execute instructions, for example, executable instructions that perform one or more operations described herein and that may be stored in memory 110 and in storage 114. Network interface 112 enables host 105 to communicate with other devices via a communication medium, such as data network 122 and/or management network 126. Network interface 112 may include one or more network adapters or ports, also referred to as Network Interface Cards (NICs), for connecting to one or more physical networks. In certain embodiments, data network 122 and management network 126 may be different physical networks as shown, and the hosts 105 may be connected to each of the data network 122 and management network 126 via separate NICs or separate ports on the same NIC. In certain embodiments, data network 122 and management network 126 may correspond to the same physical network, but different network segments, such as different subnets or different logical VLAN segments.

System memory 110 is hardware allowing information, such as executable instructions, configurations, and other data, to be stored and retrieved. Memory 110 is where programs and data are kept when CPU 108 is actively using them. Memory 110 may be volatile memory or non-volatile memory. Host bus adapter (HBA) couples host 105 to one or more external storages (not shown), such as a storage area network (SAN) or distributed virtual SAN. Other external storages that may be used include network-attached storage (NAS) and other network data storage systems, which may be accessible via NIC 112.

CA 117 is a specialized type of processor that performs certain mathematical calculations faster than CPU 108. For example, a graphics processing unit (GPU) is a CA specially designed to rapidly manipulate and alter memory for the creation of images. Other examples of CAs include specialized silicon, digital signal processors (DSPs), and field-programmable gate array (FPGAs). CA 117 may be located within host 105 or may be peripheral to host 105. CAs typically function in groups or farms in which many CAs work together to execute a kernel so as to perform a CA workload for that kernel. As such, CA 117 may be a plurality of CAs working together. In the context of CAs, a "kernel" or "compute kernel" is a small piece of code with one or more loops, and the loop(s) is executed many times by a CA or group of CAs to perform a CA workload. For additional details on CAs, CA workloads, and kernels see application Ser. No. 15/990,537, filed May 25, 2018, the entire contents of which are incorporated by reference herein.

Storage system 114 represents persistent storage device(s). Storage 114 includes a controller 134, mapping module 136, optionally base VM code 142, and a plurality of storage disks $128_1$ to $128_n$ (collectively referred to as disks 128 and individually referred to as disk 128). Storage disks 128 may be one or more hard disks, flash memory modules, solid state disks, and/or optical disks. Although storage 114 is shown as being local to host 105, storage 114 may be external to host 105, such as by connection via HBA 115.

Figure 1B:
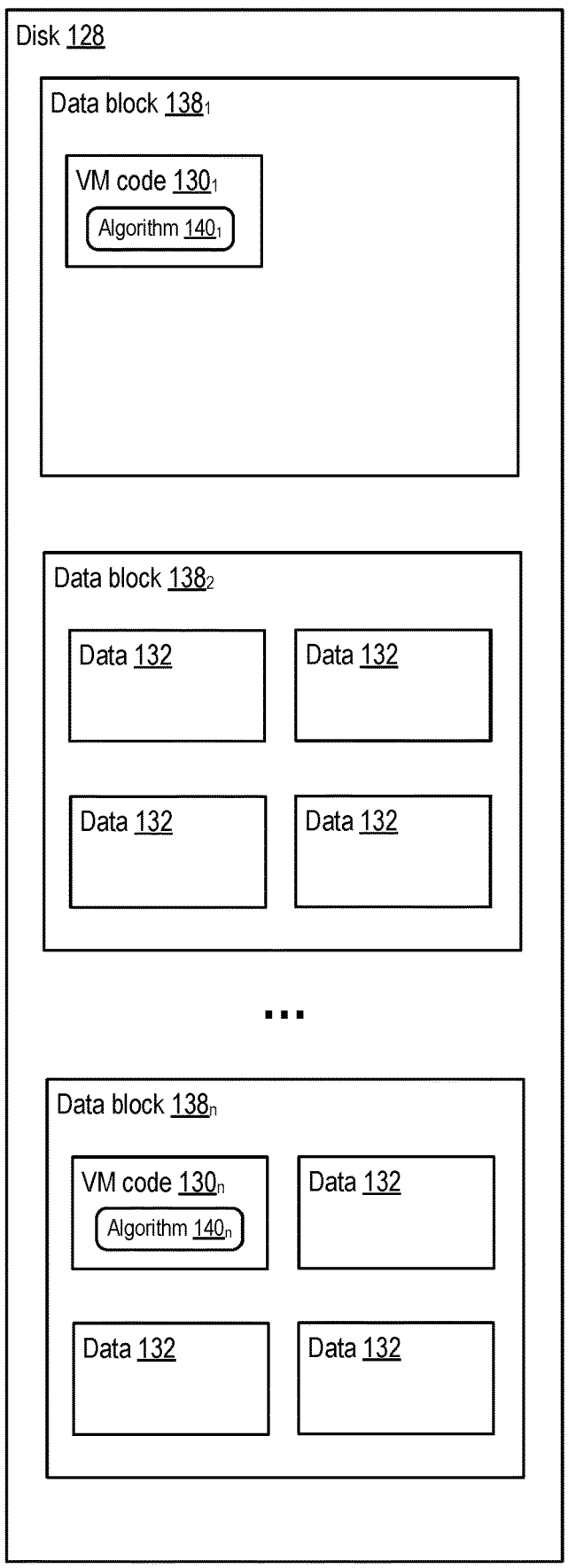
FIG. 1B depicts a block diagram showing organization of a storage disk, according to an embodiment.

FIG. 1B depicts a block diagram showing organization of a storage disk 128, according to an embodiment. Data on disks 128 may be organized in a plurality of data blocks $138_1$ to $138_n$ (collectively referred to as blocks 138 and individually referred to as block 138). The size of block 138 may be, for example, 4 KB, 8 KB, 40 KB, 100 KB, 1 MB, 2 MB, or 10 MB. Each block 138 may contain data 132, VM code 130, or a combination. Data 132 is any data other than VM code 130. Data 132 may be data on which an application (not shown) running on host 105 may perform operations, such as create, retrieve, update, delete (CRUD) operations. Each block 138 may be an object, such as a container object, and/or may be a division of storage 114 and/or data structure 128.

VM code 130 is code that, when instantiated, alone or in conjunction with base VM code 142, becomes a running VM, such as one of VMs 120. VM code 130 may be partial code for VM 120, such that when VM code 130 is combined with base VM code 142, then the combined VM code may be instantiated on host 105 to result in a running VM 120. VM code 130 may be merely an instruction to instantiate base VM code 142, or a pointer to base VM code 142. Base VM code 142 may be an operational VM or partial code for an operational VM, and VM code 130 may be an update or upgrade to base VM code 142. VM code 130 may be a "seed" or input to algorithm 140 in embodiments in which algorithm 140 is contained wholly within base VM code 142. Although VM code 130 is described in reference to a virtual machine, VM code may comprise code for any type of VCI. For example, VM code 130 may comprise code for a container layer, which when combined base VM code 142 (e.g., base code for a container), may be executable as a functional container object. As further described below, VM code 130 may also be present within a mapping table (not shown) of mapping module 136. A VM or VCI instantiated at least in part by VM code 130, as described above, is herein referred to as an "embedded VM" 120.

Although base VM code 142 is shown in FIG. 1A as located on storage 114, base VM code 142 may located anywhere that is accessible to host 105 on which an embedded VM 120 is instantiated. For example, base VM code 142 may be located in memory 110, local memory of CA 117, on a separate host 105 of data center 102, or on a remote data center across network 146.

VM code 130 may contain algorithm 140. When algorithm 140 is executed, such as by embedded VM 120, algorithm 140 returns a location identifier corresponding to a location within storage 114. A location identifier may be an address on one of disks 128 or the beginning of data block 138. A location identifier may comprise a two-tuple consisting of a disk identifier and a block identifier within that disk, such as the two-tuple "($128_1$, 5)" corresponding to block 5 of disk $128_1$. Algorithm 140 may take as an input a location identifier within storage 114, or algorithm 140 may run without an input. Algorithm 140 may be a complete algorithm, or algorithm 140 may be a partial algorithm, with the rest of the algorithm present on base VM code 142. Algorithm 140 may also be wholly present within base VM code 142, with none of the code for algorithm 140 being present within VM code 130 of data block 138.

The purpose of algorithm 140 within VM code 130 is to include a dynamic algorithm that distributes or scatters data within disks 128 of storage 114. For example, an application running on host 105 may make a read request for data located at block $138_1$ of disk $128_1$ of storage 114. As shown in FIG. 1B, no data 132 is stored at block $138_1$ of disk $128_1$. Rather, VM code $130_1$ is at block $138_1$ of disk $128_1$. Responsive to the read request for data at $138_1$ of disk $128_1$, controller 134 executes VM code $130_1$ so as to instantiate embedded VM 120 that is embedded in data block $138_1$ by VM code $130_1$. The embedded VM 120 of VM code $130_1$ then executes algorithm $140_1$, either on CPU 108 or CA 117. Algorithm $140_1$ returns a new location identifier. The data requested by the application may then be found at the location represented by the new location identifier. To add an additional layer of security, the new location identifier may itself contain VM code 130 with an algorithm 140, which then executes and returns another location identifier at which the data requested by application 140 may be found.

VM code 130 and base VM code 142 are particular to VMs and VCIs, such that when combined by varying operating systems or hypervisors on different hosts, the instantiated combination of VM code 130 and base VM code 142 result in a running VM, or in a running VCI generally. Essentially, in an embodiment, complete code for a running VM 120 may be split into two or more parts, with one part being VM code 130, another part being base VM code 142, and other parts being located elsewhere, as needed. Algorithm 140 may also be split into two or more parts also, such that part of algorithm 140 or the code for algorithm 140 is contained within VM code 130, and part of algorithm 140 or code for algorithm 140 is contained within base VM code 142. In an embodiment, neither base VM code 142 nor VM code 130 comprise code for an OS or for general software modules that merely support the instantiation of a VM or a VCI. Similarly, in an embodiment, algorithm 140 does not comprise code for an OS or for general software modules that merely support the instantiation of a VM or a VCI.

The present disclosure provides for a method of instantiating a VCI 120, the VCI 120 containing an algorithm 140, wherein the code for the VCI 120 comprises a first part of the VCI and a second part of the VCI, and wherein the code for the algorithm comprises a first part of the algorithm and a second part of the algorithm, the first part of the VCI comprising the first part of the algorithm, the second part of the VCI comprising the second part of the algorithm, the first part of the VCI being stored separately and/or remotely from the second part of the VCI, wherein instantiating the VCI 120 comprises combining the first part of the VCI and the second part of the VCI, and wherein executing the algorithm 140 comprises combining the first part of the algorithm and the second part of the algorithm, and further wherein executing the algorithm 140 may comprise combining the first part of the VCI and the second part of the VCI.

Each algorithm 140 of storage 114 may be unique. VM code 130 and algorithm 140 are dynamic in that both are upgradeable. An upgrade process of VM code 130 is described with reference to FIG. 3, below.

Algorithm 140 may be a non-transparent and dynamic algorithm, which increases security for storage 114. The algorithm is non-transparent in that the logic of the algorithm is masked within the execution of a virtual machine. Algorithm 140 improves security by limiting the ability of a malicious entity to reconstruct data on storage 114. Because each algorithm 140 in storage 114 may be different, and may change with time, deducing the placement of data 132 on storage 114 becomes an arduous task, as compared to a single static algorithm for scattering data 132 within storage 114.

Algorithm 140 may be in the form of a kernel, to be executed on CA 117. Data 132 on the same block 138 as VM code 130, or other data, may serve as a working set for the kernel. An advantage of running algorithm 140 on CA 117 is that CA 117 is peripheral to CPU 108, and the execution flow of CA 117 will not interfere with the execution of processes on CPU 108. For example, if algorithm 140 contained an infinite loop, the infinite loop running on CA 117 would not inhibit normal operation of CPU 108, and thus would not inhibit operations of other applications or VMs 120 running on host 105. Another advantage of running algorithm 140 on CA 117 is that CA 117 may be specialized for executing the mathematical functions of algorithm 140, and thus may complete execution of algorithm 140 faster than CPU 108, improving latency of data storage operations. An additional advantage is that CA 117 is a specialized processor, so CA 117 may have a reduced instruction set compared to CPU 108. A reduced instruction set reduces the attack surface of a processor, making CA 117 more secure and more able to withstand malicious attacks, as compared to CPU 108. For details on one embodiment of executing a kernel and working set on CA 117, see application Ser. No. 15/990,537, incorporated by reference above.

Returning to FIG. 1A, controller 134 is the managing module for storage 114. Controller 134 is aware of the topology of disks 128 and may handle operations on data 132 of storage 114. Controller 134 may execute an upgrade process of VM code 130, such as the process shown in FIG. 3. Although controller 134 is shown as present on storage 114, controller 134 may be external to storage 114, and may be, for example, a driver for storage 114 installed on host 105.

Mapping module 136 is a software service that translates a logical location identifier (e.g., logical address) into a physical location identifier (e.g., physical address) on storage 114, such as on one of disks 128. Mapping module 136 may translate a logical address into a physical address by using a static algorithm that takes as input a logical location identifier and returns the corresponding physical location identifier. Mapping module 136 may translate a logical address into a physical address by using a mapping table (not shown) that maps a certain logical address to a physical address. The mapping table may have embedded in some or all of its entries VM code 130.

VM code 130 within a mapping table of mapping module 136 may function similarly VM code 130 within data block 138. A logical location identifier may function as an index into the mapping table, and the index may map to VM code 130, which when instantiated into an embedded VM 120, returns a new location identifier corresponding to a location within storage 114 on which on operation may be performed. VM code 130 within the mapping table may be code for a complete VM 120 or may be partial code that is executed together with base VM code 142.

Gateway 124 provides VMs 120 and other components in data center 102 with connectivity to network 146. Network 146 may be, for example, a direct link, a local area network (LAN), a wide area network (WAN) such as the Internet, another type of network, or a combination of these. Gateway 124 may manage external public IP addresses for VMs 120 and route traffic incoming to and outgoing from data center 102 and provide networking services, such as firewalls, network address translation (NAT), dynamic host configuration protocol (DHCP), and load balancing. Gateway 124 may use data network 122 to transmit data network packets to hosts 105. Gateway 124 may be a virtual computing instance, a physical device, or a software module running within host 105. Gateway 124 may include two gateways: a management gateway for management network 126 and a data gateway for data network 122.

Figure 2:
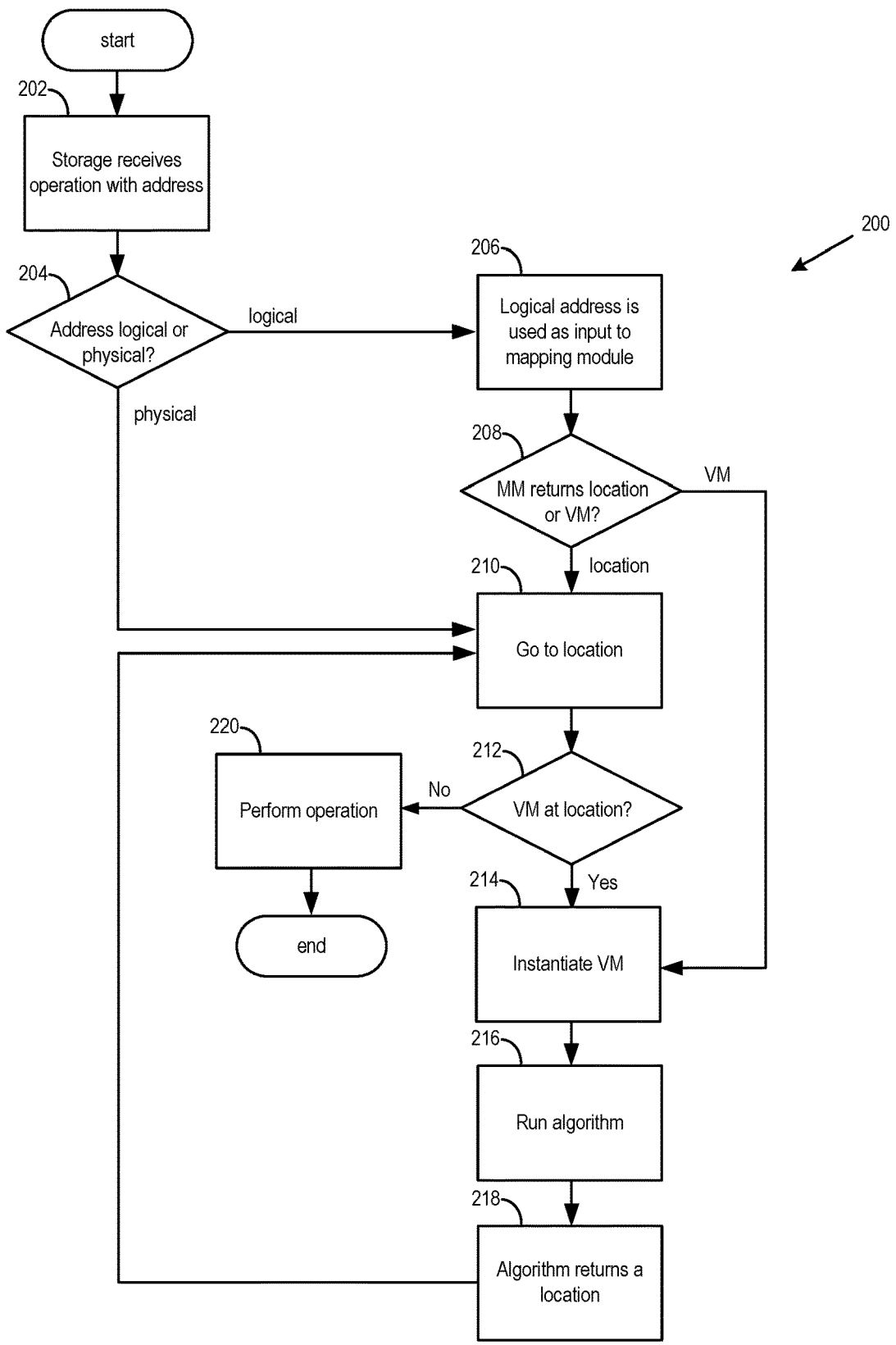
FIG. 2 depicts a flow diagram of a method of finding a location on a storage medium and performing an operation on that location, according to an embodiment.

FIG. 2 depicts a flow diagram of a method 200 of finding a location on storage 114 and performing an operation on that location, according to an embodiment. Method 200 applies to an embodiment in which disks 128 are physical disks and storage 114 is a physical storage system. Method 200 may also apply to a virtual storage system with virtual disks, such as to an embodiment in which disks 128 are virtual disks and storage 114 is a virtual storage system. In the embodiment in which storage 114 is a virtual storage system, the term "physical" as applied to a location within storage 114 refers to a location perceived by the virtual storage system as a physical location.

At step 202, storage 114 receives a command to perform an operation on a location, such as a write operation. The location is identified within the command by a location identifier (e.g., an address). The command may be received by controller 134 of storage 114. The location identifier within the command may be a logical location identifier that may need to be translated to a physical location identifier.

At step 204, controller 134 determines whether the location identifier is a logical identifier or a physical identifier. Step 204 is optional if storage 114 is configured such that a location identifier, received by controller 134, is always either a logical identifier or a physical identifier. If the location identifier is a logical location identifier, then method 200 proceeds to step 206. If the location identifier is a physical location identifier, then method 200 proceeds to step 210.

At step 206, mapping module 136 translates the logical location identifier to a physical location identifier. As described above, the translation may be performed by an algorithm, such as a static algorithm, or the translation may be performed by a mapping table for which the logical location may serve as an index. The mapping table may map to a physical location identifier, or the mapping table may map to VM code 130, which is instantiated into an embedded VM 120. As stated above, the embodiment in which storage 114 is a virtual storage system, the term "physical" as applied to a location within storage 114 refers to a location perceived by the virtual storage system as a physical location.

At step 208, controller 134 determines whether mapping module 136 returns a location identifier or VM code 130. If mapping module 136 returns a physical location, then method 200 proceeds to step 210. If mapping module 136 returns VM code 130, then method 200 proceeds to step 214. It should be noted that mapping module may return a logical location identifier rather than a physical location identifier so as to increase security of storage 114 by adding another layer of misdirection as to the organization of data within storage 114. If a logical location identifier is determined to have been returned at step 208, method 200 may proceed back to step 206 to perform another translation on the returned logical location identifier.

At step 210, controller 134 goes to the location identified by the physical location identifier of step 204 or step 208. At step 212, controller 134 determines whether VM code 130 is present at the physical location of the physical location identifier of step 210. If VM code 130 is not present, then no further misdirection has been programmed in the topology of the path from location identifier of step 202 to location identifier of step 210, and method 200 proceeds to step 220. If VM code 130 is present, then method 200 proceeds to step 214.

At step 220, the operation of step 202 is performed on the data of the physical location of the location identifier of step 212, within storage 114. For example, if the operation of step 202 had been a write operation, then data 132 is written to the physical location corresponding to the location identifier of step 212. After step 220, method 200 ends.

At step 214, an embedded VM 120 is instantiated by using at least VM code 130 of step 212. As stated above, VM code 130 may be: complete code for a running VM 120, partial code that may be instantiated together with base VM code 142, instructions to execute base VM code 142, or a pointer to base VM code 142.

At step 216, algorithm 140 is executed. Algorithm 140 may use as input the location identifier of step 212, data 132 of the same data block 138 as VM code 130 of step 212, time data from a trusted server, or other data. Alternatively, algorithm 140 may have no input data that influences its execution. Algorithm 140 may be executed by an embedded VM 120 on CPU 108. As discussed above, algorithm 140 may be a compute kernel executed on CA 117.

At step 218, algorithm 140 returns a physical location identifier. Then, controller 134 accesses the location within storage 114 corresponding to the physical location identifier. In an embodiment, the location identifier returned at step 218 may be a logical location identifier, in which case method 200 may proceed from step 218 to step 206. A physical location returned at step 218 may contain VM code 130, in which case steps 210 to 218 would repeat again. Or, physical location returned at step 218 may contain data on which the operation of step 202 is to be executed, in which case method 200 would go through steps 210, 212, 220, and then end.

Figure 3:
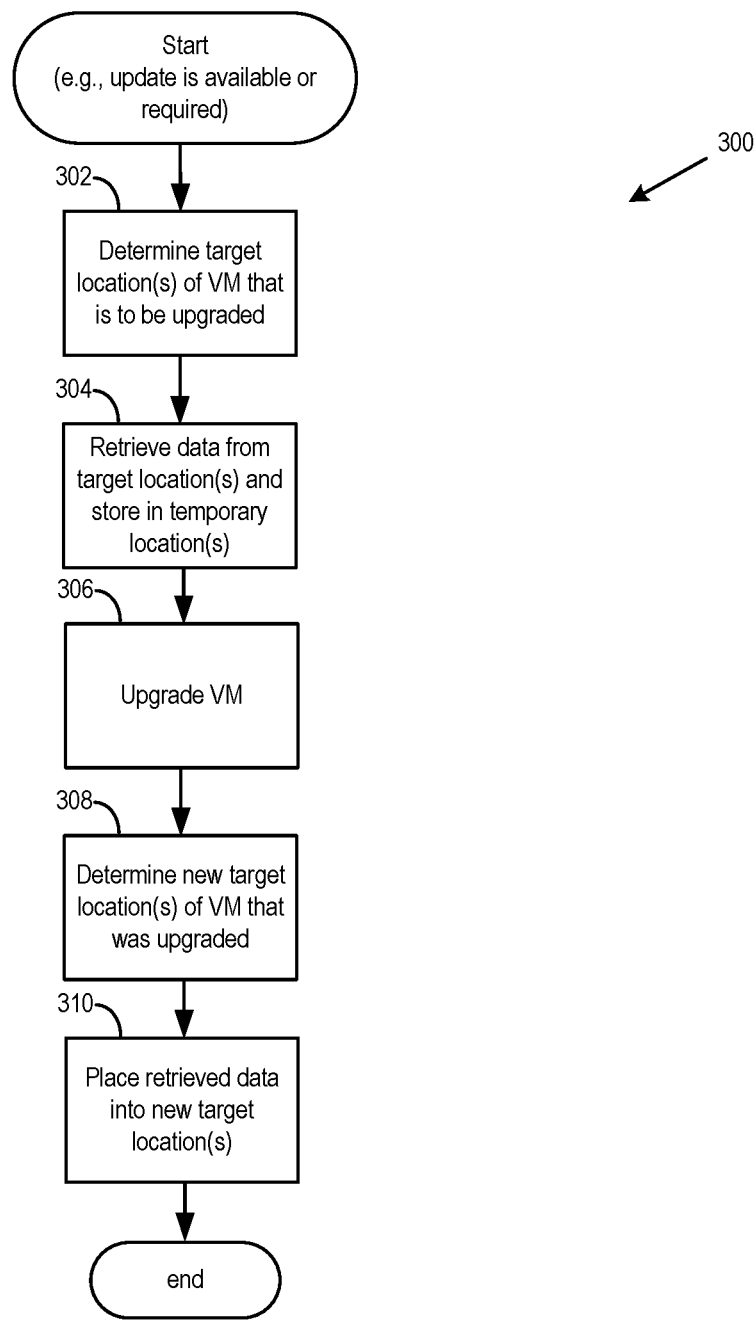
FIG. 3 depicts a flow diagram of a method of upgrading a path to a location on a storage medium, according to an embodiment.

FIG. 3 depicts a flow diagram of a method 300 of upgrading a path to a location on storage 114, according to an embodiment. Method 300 is exemplary, and other methods of updating a path to a location on storage 114 may be used, consistent with the teachings herein. Method 300 may be triggered, for example, when an update becomes available, or when an update is explicitly initiated such as by an administrator or automatically by a software module upon satisfaction of conditions. Method 300 may be performed by controller 134 or another module.

For the purpose of illustration, VM code $130_1$ of data block $138_1$ of disk $128_1$ is to be updated so as to insert a new algorithm $140_1$ into VM code $130_1$. In the example, it is assumed that the result of executing algorithm $140_1$ is always a location identifier corresponding to data block $138_2$. Thus, data block $138_2$ is the only data block that needs to be relocated within storage 114 as a result of updating VM code $130_1$.

As used for the purpose of describing method 300, the term "target location" refers to a location within storage 114 that (a) could be returned by algorithm 140 within VM code 130 that is being upgraded, and (b) contains data (is not empty). A target location in method 300 is a location influenced by the upgrading given VM code 130 at step 306.

At step 302, controller 134 locates VM code 130 to be upgraded and determines all target locations within storage 114 of that VM code 130. To determine all target locations, controller 134 may, for example, run algorithm 140 within VM code 130 to be upgraded using all possible inputs. Controller 134 may then determine all possible outputs, and check whether the locations corresponding to the outputs contain data. Following the example above, controller 134 determines that the only location affected by upgrading VM code $130_1$ is data block $138_2$, and controller 134 then notes data block $138_2$ as the only target location of VM code $130_1$. The target locations determined at step 302 may be referred to as "original target locations," and the location identifiers corresponding to those locations may be referred to as "original target location identifiers."

At step 304, controller 134 retrieves all data from all target location(s) determined at step 302. The retrieved data includes all data, such as any VM code 130 that may be present within the target location(s), and any data 132 that may be present within the target location(s). Controller 134 then stores the retrieved data at a temporary location, while also storing metadata that would allow controller 134 to properly place the retrieved data back into new locations of storage 114. The new location would need to match outputs of the upgraded VM code 130.

Controller 134 may keep track of metadata such as where the retrieved data had been stored previously, or may keep track of metadata such as the algorithm input associated with the retrieved data. Following the above example, controller 134 stores data 132 of data block $138_2$ within a temporary location. Controller 134 may also store metadata such as that the retrieved data had been previously stored at data block $138_2$ of disk $128_1$, or metadata such as input values required for the un-upgraded algorithm 140 to return the location identifier for target data block $138_2$. For the purposes of the example, it is assumed that controller 134 stored metadata of input value of the un-upgraded algorithm 140, and the input value is the location identifier "(14, 18)," indicating a location of block 18 on disk 14 (not shown). That is, when the location identifier "(14, 18)" is taken as input by un-upgraded algorithm $140_1$, the return value is "($128_1$, $138_2$)."

At step 306, controller 134 upgrades VM code 130. The upgrade of VM code 130 may be any change within data center 102 or elsewhere that affects output values of algorithm 140 of VM code 130 being upgraded. The upgrade of VM code 130 may occur, for example, by changing one of or a combination of: algorithm 140, VM code 130, data used as input for algorithm 140, or base VM code 142. Following the above example, controller 134 may upgrade VM code $130_1$ and algorithm $140_1$.

At step 308, controller 134 determines new target locations of upgraded VM code 130. The new target locations may be determined, for example, by inputting stored input values of un-upgraded algorithm 140, into upgraded algorithm 140 of upgraded VM code 130. Following the above example, controller 134 may input the location identifier "(14, 18)" into upgraded algorithm $140_1$ to obtain the new target location of data that had been retrieved at step 304. For the purposes of the example, it is assumed that the new target location of data returned by upgraded algorithm $140_1$ is represented by location identifier "($128_2$, $138_n$)," or block $138_n$ of disk $128_2$.

At step 310, controller 134 places all data retrieved at step 304 into its new location(s) within storage 114, as determined at step 308. As part of step 310, controller 134 may determine whether the new target location(s) are reserved for data and/or contain data. If so, then this may indicate a conflict with another algorithm 140 within storage 114, and controller 134 may store the data present at conflicting locations within a temporary location until the conflict is resolved, such as by another upgrade to another VM code 130 using method 300. Following the above example, controller 134 places data that had been retrieved at step 304 into location of storage 114 corresponding to location identifier $128_2$, $138_n$. After step 310, method 300 ends.

It should be understood that, for any process described herein, there may be additional or fewer steps performed in similar or alternative orders, or in parallel, within the scope of the various embodiments, consistent with the teachings herein, unless otherwise stated.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments.

By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

I claim:

1. A method of obscuring organization of data within a storage system, the method comprising:
   receiving a command to perform an operation on the storage system, the command comprising a location identifier indicative of a location on the storage system, wherein the location contains at least part of a code for a first virtual computing instance (VCI), the first VCI comprising a first algorithm;
   in response to receiving the command, instantiating the first (VCI), wherein the first VCI is instantiated on a host computer;
   executing, by the first VCI, the first algorithm;
   returning, from execution of the first algorithm a second location identifier indicative of a second location on the storage system; and
   based on the returned second location identifier, performing the operation, on the second location on the storage system.

2. The method of claim 1, wherein the location comprises a first block of the storage system.

3. The method of claim 2, wherein the code for the first VCI comprises a first part and a second part, wherein the first part is stored in the first block and wherein a second part comprises base VCI code, and wherein the first VCI is instantiated by combining the first part and the base VCI code.

4. The method of claim 3, wherein the storage system comprises a second block containing code for a second VCI, wherein the second VCI is instantiated by combining at least the code for the second VCI and the base VCI code, the second VCI comprising a second algorithm that when executed, returns a third location identifier.

5. The method of claim 3 further comprising a second storage system, wherein the base VCI code is stored on the second storage system.

6. The method of claim 2, wherein the location identifier is used as an input to the first algorithm for the executing of the first algorithm, to return the second location identifier.

7. The method of claim 1, wherein the storage system comprises a first block and a second block, the first block containing code for instantiating the first VCI and the second block containing code for instantiating a second VCI comprising a second algorithm, wherein the first algorithm is different from the second algorithm.

8. The method of claim 1, further comprising, prior to instantiating the first VCI, instantiating a second VCI comprising a second algorithm, obtaining as a return value from the second algorithm the location identifier.

9. The method of claim 1, wherein the location identifier comprises a logical location identifier, the method further comprising:
   translating the logical location identifier to a physical location identifier corresponding to the location on the storage system.

10. The method of claim 1, further comprising upgrading the storage system by:
    determining an original set of location identifiers corresponding to reserved locations on the storage system and capable of being returned by the first algorithm;
    retrieving data from the original set of location identifiers;
    upgrading code associated with the first algorithm or modifying data used by the first algorithm during execution of the first algorithm;
    determining a new set of location identifiers within the storage system; and
    placing the retrieved data into one or more locations within the storage system, the one or more locations corresponding to the new set of location identifiers.

11. A non-transitory computer readable medium comprising instructions to be executed in a processor of a computer system, the instructions when executed in the processor cause the computer system to carry out a method of obscuring organization of data within a storage system, the method comprising:
    receiving a command to perform an operation on the storage system, the command comprising a location identifier indicative of a location on the storage system, wherein the location contains at least part of a code for a first virtual computing instance (VCI), the first VCI comprising a first algorithm;
    in response to receiving the command, instantiating the first (VCI), wherein the first VCI is instantiated on a host computer;
    executing, by the first VCI, the first algorithm;
    returning, from execution of the first algorithm a second location identifier indicative of a second location on the storage system; and
    based on the returned second location identifier, performing the operation, on the second location on the storage system.

12. The non-transitory computer readable medium of claim 11, wherein the location comprises a first block of the storage system.

13. The non-transitory computer readable medium of claim 12, wherein the code for the first VCI comprises a first part and a second part, wherein the first part is stored in the first block and wherein a second part comprises base VCI code, and wherein the first VCI is instantiated by combining the first part and the base VCI code.

14. The non-transitory computer readable medium of claim 13, wherein the storage system comprises a second block containing code for a second VCI, wherein the second VCI is instantiated by combining at least the code for the second VCI and the base VCI code, the second VCI comprising a second algorithm that when executed, returns a third location identifier.

15. The non-transitory computer readable medium of claim 13, the method further comprising a second storage system, wherein the base VCI code is stored on the second storage system.

16. The non-transitory computer readable medium of claim 12, wherein the location identifier is used as an input to the first algorithm for the executing of the first algorithm, to return the second location identifier.

17. The non-transitory computer readable medium of claim 11, wherein the storage system comprises a first block and a second block, the first block containing code for instantiating the first VCI and the second block containing code for instantiating a second VCI comprising a second algorithm, wherein the first algorithm is different from the second algorithm.

18. The non-transitory computer readable medium of claim 11, the method further comprising, prior to instantiating the first VCI, instantiating a second VCI comprising a second algorithm, obtaining as a return value from the second algorithm the location identifier.

19. The non-transitory computer readable medium of claim 11, wherein the location identifier comprises a logical location identifier, the method further comprising:

translating the logical location identifier to a physical location identifier corresponding to the location on the storage system.

20. A computer system comprising:
a storage system;
a host computer;
a first virtual computing instance (VCI); and
a processor, wherein the processor is programmed to carry out a method of obscuring organization of data within the storage system, the method comprising:
  receiving a command to perform an operation on the storage system, the command comprising a location identifier indicative of a location on the storage system, wherein the location contains at least part of a code for the first VCI, the first VCI comprising an algorithm;
  in response to receiving the command, instantiating the first VCI, wherein the first VCI is instantiated on the host computer;
  executing, by the first VCI, the first algorithm;
  returning, from execution of the first algorithm a second location identifier indicative of a second location on the storage system; and
  based on the returned second location identifier, performing the operation, on the second location on the storage system.

* * * * *